United States Patent
Kaplan

[15] 3,688,744
[45] Sept. 5, 1972

[54] AUTOMATIC FISH FEEDING APPARATUS

[72] Inventor: Eric S. Kaplan, 20 Beechtree Road, West Caldwell, N.J. 07006

[22] Filed: March 10, 1971

[21] Appl. No.: 122,744

[52] U.S. Cl. .....................119/51.11, 222/158, 119/3
[51] Int. Cl. ..........................A01k 5/02, A01k 64/00
[58] Field of Search........119/51, 51.11, 51.13, 5, 56, 119/3; 222/70, 252, 185

[56] References Cited

UNITED STATES PATENTS

| 2,865,447 | 12/1958 | Kaufman | 119/3 |
| 3,031,109 | 4/1962 | Krag | 222/185 X |
| 3,050,029 | 8/1962 | Appleton | 119/51.11 X |

Primary Examiner—Aldrich F. Medbery
Attorney—Harry Falber

[57] ABSTRACT

An apparatus for automatically dispensing fish food at periodic intervals, said apparatus comprising a food reservoir having at least one discharge opening in the base thereof and a leveling block affixed to the inner wall of said reservoir directly above said discharge opening, a feed carrier plate having at least one opening thereon and being seated for rotation in said reservoir between the base thereof and the leveling block and in close tolerance therewith, said carrier plate being secured to the shaft of a motor to provide said rotation; and means for mounting the apparatus on the fish tank.

5 Claims, 4 Drawing Figures

PATENTED SEP 5 1972  3,688,744

INVENTOR.
ERIC S. KAPLAN
BY Harry Friver
ATTORNEY 3,688,744

AUTOMATIC FISH FEEDING APPARATUS

BACKGROUND OF THE INVENTION

Numerous problems are encountered in the keeping of pet fish in an aquarium. For example, it is desirable that fish be fed only a prescribed quantity of food at regulated time intervals. This schedule is often difficult to maintain especially when the fish fancier is absent for a few days or when he must supervise a large number of aquaria.

While automatic feeding devices are known in the prior art, they have often consisted of intricate, expensive systems. The intricacy of the prior art mechanisms greatly increases the difficulty and expense of repair. It also tends to reduce the reliability of the feeder. For example, automatic feeders are disclosed in U.S. Pat. Nos. 3,031,109; 3,050,029 and 2,865,447. It is to be noted that each of these feeders specifies an intricate cam arrangement in its operation and utilizes a multi-chambered housing for its component parts. Needless to say, the potential difficulty and expense which are directly related to the sophistication of the apparatus prove to be a substantial burden to the amateur fish fancier.

SUMMARY OF THE INVENTION

It is the primary object of this invention to provide an automatic feeding apparatus wherein predetermined quantities of food may be discharged at regularly spaced time intervals.

It is a further object to provide an automatic feeder which is of simple design, is highly efficient and reliable for its intended purpose, and can be made of virtually any desired material.

Various other objects and advantages of this invention will become apparent from the following detailed description thereof.

In accordance with this invention, an automatic feeder is provided which consists of (1) a feed reservoir having an opening in its base which is in communication with the aquarium, (2) a feed carrier plate which is seated for rotation in the reservoir and contains an opening for conveying the fish food to the discharge opening in the reservoir and subsequent discharge into the tank, (3) for driving the feed carrier plate, a synchronous motor and shaft to which the feed carrier plate is secured, (4) a leveling block affixed to the inner wall of said reservoir directly above said discharge opening and spaced therefrom by the thickness of the feed carrier plate, and (5) means for mounting the feeder on the tank. The subject feeder thus overcomes the difficulties encountered with the prior art systems by providing a simple, compact, and economical device for automatically dispensing fish food.

The invention is more specifically defined in the appended claims read together with the following description and accompanying drawings in which FIG. 1 is a view partly in cross section and partly in elevation depicting a fish feeder according to the invention mounted in position on an aquarium;

FIG. 2 is a top plan view of the feed reservoir utilized in the feeder of FIG. 1; and FIG. 3 and FIG. 4 are top plan views of typical feed carrier plates utilized in the feeder of FIG. 1.

DESCRIPTION OF THE PREFERRED EMBODIMENTS

Figure 1:
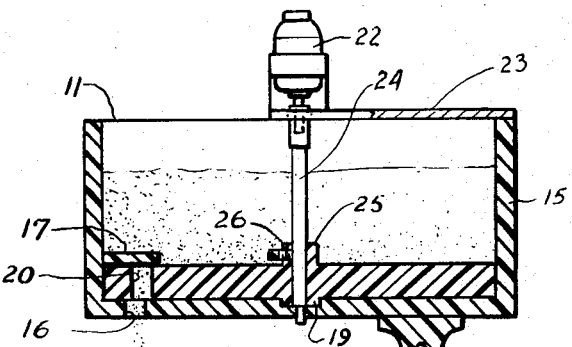

Referring now to FIG. 1, a fish feeder 11 according to the invention is shown mounted on one wall 12 of a conventional fish tank 13 to project over the top opening of the tank 13. Such mounting may be achieved by the use of any suitable type of clamping or holding device 14. The device 14 shown represents a tension clamp which is merely fitted onto the tank wall, the necessary support being provided by the tension exerted against the tank wall by each arm of the clamp 14. Needless to say, all types of clamps, brackets, hooks, screw attachments, and the like may be utilized to secure the feeder 11 to the tank 13.

Figure 2:
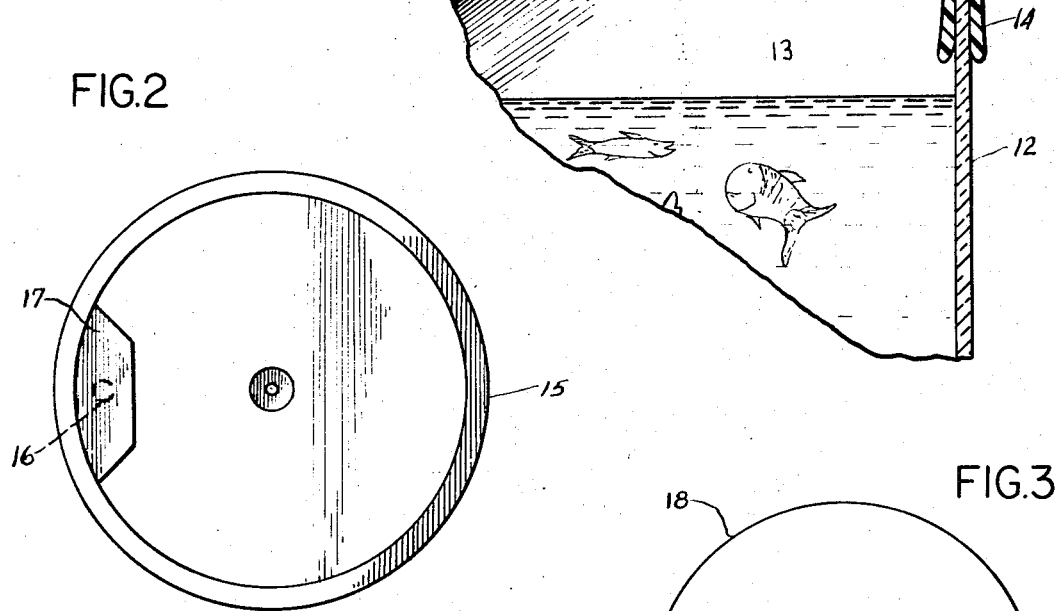

The feeder 11 comprises a cylindrical feed reservoir 15 for storing a quantity of food sufficient to meet the daily requirements for a reasonably long period of time. As noted in FIG. 1 and FIG. 2, the reservoir 15 has at least one discharge opening 16 in its base which is generally located toward the periphery of the base, the discharge opening 16 placing the feeder 11 in communication with tank 13. The feed reservoir 15 also contains a leveling block 17 affixed to the inner wall of said reservoir directly above said discharge opening 16 and spaced therefrom. The primary function of the leveling block 17 is to insure that only the predetermined quantity of food is available for discharge into tank 13, as described hereinafter. Accordingly, the leveling block 17 is made to extend beyond each of the circumferential sides of the discharge opening 16 by at least the length of the diameter of said discharge opening 16.

Figure 3:
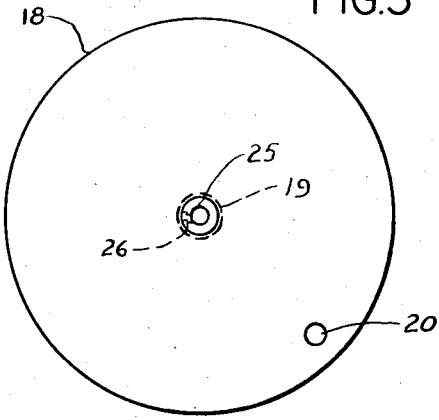
Figure 4:
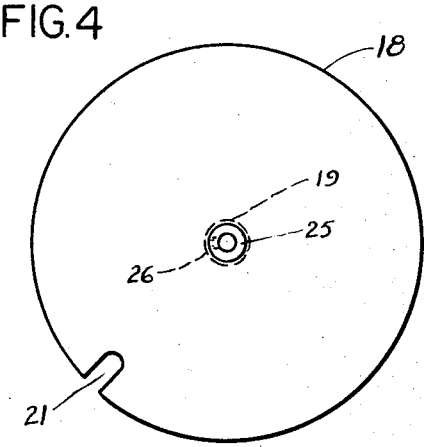

The feed carrier plate 18 as depicted in FIG. 1, FIG. 3 and FIG. 4, is seated for rotation in reservoir 15 by means of extension hub 19. The indented seating of the carrier plate 18 helps to insure that the carrier plate 18 will rotate through a constant plane in an unimpeded manner. The feed carrier plate 18 also contains at least one opening 20, which carries the desired quantity of fish food during the rotation of the carrier plate 18. The opening 20 may be an aperture in the plate 18 (FIG. 3) located at a distance from the center of the feeder 11 equal to the distance between opening 16 in the reservoir 15 and the center of feeder 11 or it may be a U-shaped cut-out 21 on the periphery of the carrier plate 18 (FIG. 4). In this manner, the openings 16 and 20 or 21 can align to allow an unimpeded discharge of food into tank 13. Furthermore, the diameter of opening 20 in carrier plate 18 should not exceed the diameter of discharge opening 16 in the reservoir 15 in order to insure that food particles do not become lodged between the carrier plate 18 and the base of the reservoir 15 thereby disrupting the continuous rotation of the carrier plate 18 and adversely effecting the general operation of feeder 11.

The corresponding dimensions of the reservoir 15 and the carrier plate 18 as well as the relative location of the leveling block 17 may be determined by the practitioner in accordance with his particular requirements. These dimensions should be chosen, however, to insure that the carrier plate 18 has complete freedom of rotation while exhibiting close tolerance with the base and inner wall of reservoir 15 as well as with the underside of leveling block 17 such that there are no appreciable gaps therebetween.

Movement is imparted to the feed carrier plate 18 by means of a synchronous motor 22. The motor 22, which is secured by means of a plate 23 extending from the rim of reservoir 15, contains a shaft 24 which passes through the center of the carrier plate 18 and the reservoir 15. The carrier plate 18 is secured to the shaft 24 by means of collar 25 and set screw 26 although other suitable arrangements may be utilized. The motor 22 provides rotation of the shaft 24 at the desired rate, for example, at a rate of one revolution per day.

In operation, the reservoir 15 is filled with fish food, thereby simultaneously loading the opening 20 in the feed carrier plate 18. The carrier plate 18 is set in motion at the predetermined rate of speed, there being no discharge of food during this period inasmuch as the underside of opening 20 is closed off by the solid portion of the reservoir base 15. As the carrier plate 18 approaches the discharge opening 16, the opening 20 therein moves beneath the leveling block 17 to a position where it is neither in contact with the bulk of the food stored in reservoir 15 nor aligned with discharge opening 16. It is thus seen that the opening 20 now contains the prescribed quantity of food to be discharged into tank 13. As the rotation continues, the opening 20 moves into the discharge position by aligning with discharge opening 16, whereby the food contained in opening 20 is gravity fed through discharge opening 16 into tank 13 for consumption by the fish. Inasmuch as the discharge operation is conducted beneath the leveling block 17, the danger of excess food entering the aligned openings is avoided. As the opening 20 leaves the discharge area, it remains beneath the leveling block 17 at least until such time as it is completely free of communication with discharge opening 20. Thereafter, the opening 20 is reintroduced into the main reservoir area for refilling and the entire cycle is allowed to repeat itself.

The cycle of operation is preferably timed to occur once a day. Where desired, however, the rate of rotation may be increased or reduced to provide a different feeding time interval. Likewise, the time interval between feedings may be reduced by utilizing a feed carrier plate with more than one opening, thereby discharging food into the tank as each opening aligns with the discharge opening in the reservoir. It is thus seen that food can be fed to the fish as frequently as desired over any desired time interval.

Furthermore, the amount of food discharged into the tank is determined by the volume of the openings in the feed carrier plate. If desired, in order to assist in the complete emptying of the opening, the walls of the openings may be tapered such that the cross-sectional area increases progressively in a downward direction. Total emptying is achieved, however, without this modification.

The primary advantage of the novel apparatus of this invention resides in the fact that it is a simple, compact, and economical device for automatically dispensing predetermined quantities of fish food at regular predetermined time intervals. It contains a minimum of moving parts thereby providing constant, dependable service while eliminating the inconvenience and expense of frequent and involved repairs. The simplicity of design allows the feeder to be manufactured from virtually any desired material, including plastics, light metals and the like.

Summarizing, this invention is seen to provide an apparatus for automatically dispensing fish food at periodic intervals. It should be understood that the present invention is not limited to the embodiments specifically described herein but extends to equivalent embodiments utilizing the principles herein disclosed as defined by the following claims.

What is claimed is:

1. An automatic feeder apparatus comprising a feed reservoir for storing a quantity of food having at least one discharge opening in the base thereof; means for mounting said reservoir on an aquarium with said discharge opening communicating with said aquarium; a feed carrier plate seated for rotation in said reservoir having at least one opening therein for carrying a given quantity of food, said opening positioned to align with said discharge opening; a leveling block affixed to the inner wall of said reservoir directly above said discharge opening and spaced therefrom by approximately the thickness of said feed carrier plate; and synchronous motor means attached to said reservoir and having a shaft extending therefrom through the center of said feed carrier plate and said reservoir, said feed carrier plate being secured to said shaft for continuously rotating said plate to place the opening in said plate in communication with said discharge opening to automatically dispense food into said aquarium at periodic time intervals.

2. The apparatus of claim 1, wherein the diameter of said opening in said feed carrier plate does not exceed the diameter of said discharge opening.

3. The apparatus of claim 2, wherein said opening in said feed carrier plate is a U-shaped section cut from the outer edge of said plate.

4. The apparatus of claim 2, wherein said opening in said carrier plate is wholly within the plate and is located at a distance from said shaft which is equal to the distance between said discharge opening and said shaft.

5. The apparatus of claim 1, wherein said leveling block extends beyond each of the circumferential sides of said discharge opening by at least the length of the diameter of said discharge opening.

* * * * *